United States Patent [19]

Nakagaki et al.

[11] 4,272,779
[45] Jun. 9, 1981

[54] SIGNAL PROCESSING CIRCUIT FOR A COLOR TELEVISION CAMERA

[75] Inventors: Shintaro Nakagaki; Itsuo Takanashi; Sumio Yokokawa; Tadayoshi Miyoshi, all of Yokohama; Koichiro Motoyama, Ninomiya; Kenichi Miyazaki, Sagamihara, all of Japan

[73] Assignee: Victor Company of Japan, Ltd., Yokohama, Japan

[21] Appl. No.: 4,721

[22] Filed: Jan. 19, 1979

[30] Foreign Application Priority Data

Jan. 20, 1978 [JP] Japan ............................... 53-5168[U]
Feb. 16, 1978 [JP] Japan ................................. 53-15953

[51] Int. Cl.³ .............................................. H04N 9/04
[52] U.S. Cl. ...................................................... 358/47
[58] Field of Search ....................... 358/21, 30, 40, 44, 358/47

[56] References Cited

U.S. PATENT DOCUMENTS 3,846,579  11/1974  Takanashi et al. ...................... 358/47

Primary Examiner—Robert L. Richardson

[57] ABSTRACT

A signal processing circuit for a color television camera has filters supplied with a multiplex input signal. The direct wave signal includes a plurality of amplitude-modulated color component signals obtained from a camera tube of a color television camera. The tube filters the high-frequency components of the input signal. Detection and processing circuits detect the output signal of the high-pass filter and produce signals having restored DC components. The circuit provides gamma correction, white clipping, linear clipping, blanking signal mixing, or like signal processing with respect to the produced signal. A low-pass filter passes the input signal from the camera tube and filters the direct wave signal of the input signal. A processing circuit processes the output signals of the low-pass filter, and a matrix circuit matrixes the output signals of the detection and processing circuits to obtain three primary color signals. A color encoder provides a composite color video signal from the three primary color signals produced by the matrix circuit.

16 Claims, 8 Drawing Figures

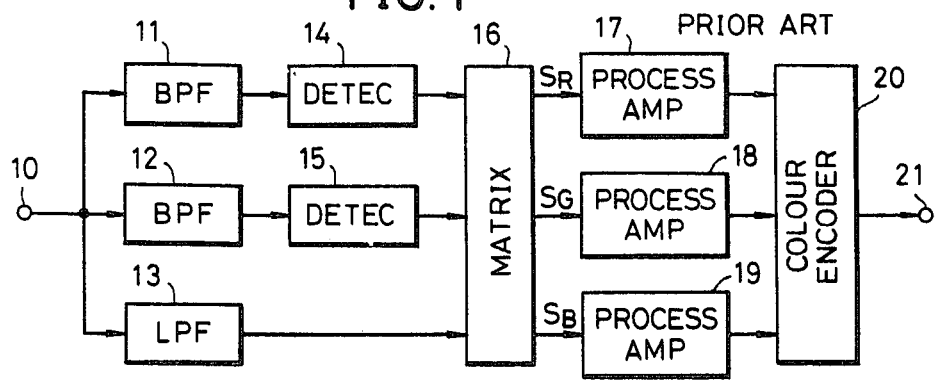
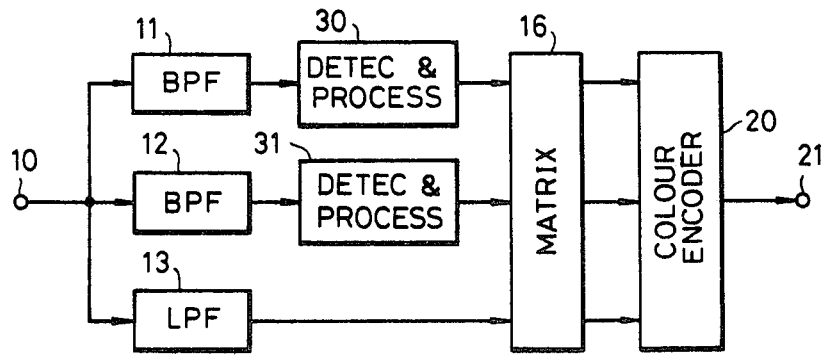
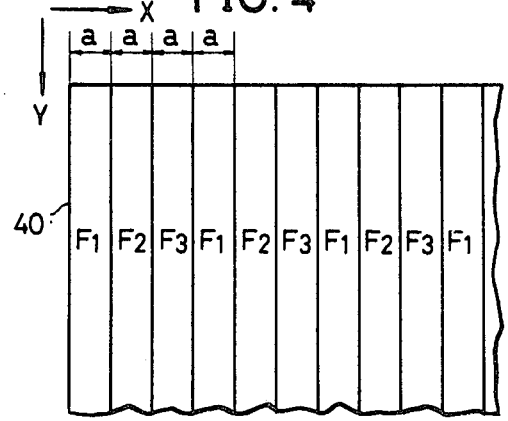

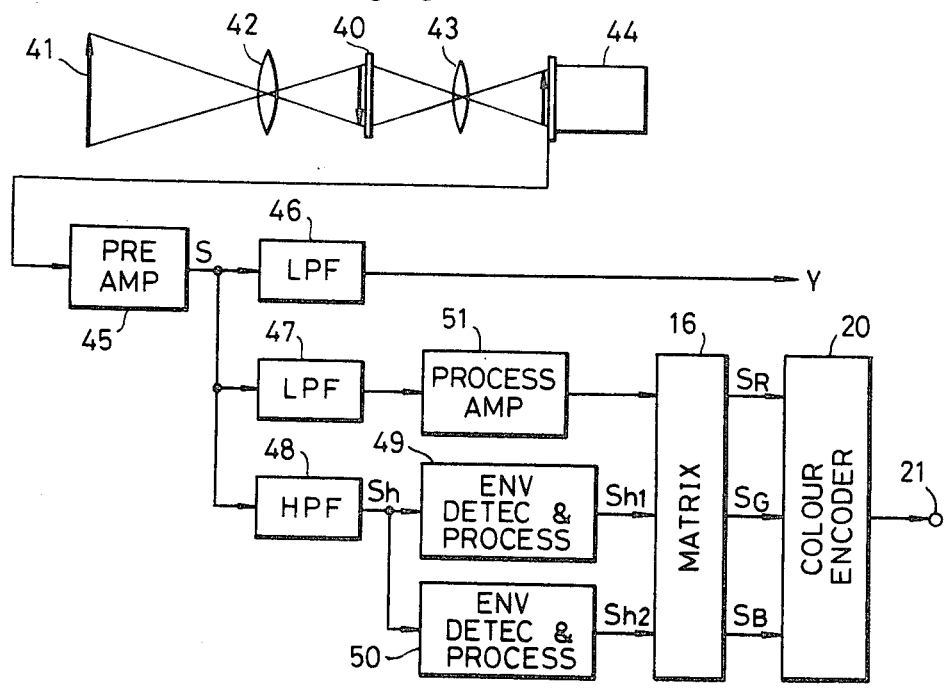
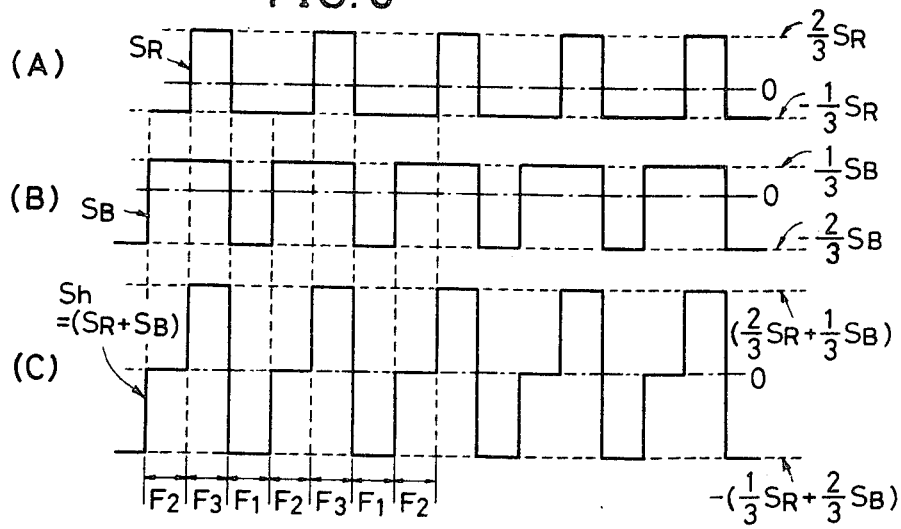

SIGNAL PROCESSING CIRCUIT FOR A COLOR TELEVISION CAMERA

BACKGROUND OF THE INVENTION

The present invention relates generally to video signal processing circuits for colour television cameras and more particularly to a video signal, envelope detection circuit for processing amplitude-modulated wave color signals obtained from the image pickup, camera tube of a color television camera. Then, the signal is immediately processed and amplified, and thereafter it is matrixed.

In a known video signal processing circuit for color television cameras, as will be hereinafter described more fully with reference to a drawing, amplitude-modulated wave colour signals are matrixed after being detected. The resulting signals are then subjected to signal processing amplification. For this reason, the DC components of the signals are restored during their detection, and their black levels are made constant. However, when the detected output signals pass through the matrixing circuit, which is an AC coupling, the black levels which should be constant lose their constant characteristics.

For this reason, at the time of process amplification of the output signals of the matrixing circuit, the known circuit must restore the DC component a second time. Accordingly, clamping circuits such as pulse clamping circuits or diode clamping circuits become necessary in the processing amplifiers, whereby problems occur, such as complication of the circuit and an impossibility of obtaining a composite colour video signal of high stability.

Moreover, in known processing methods, an amplitude-modulated signal is directly subjected processing, before detection occurs. This processing method, however, gives rise to a difficulty in that it requires a complicated circuit for causing an average picture level to assume zero.

Furthermore, a circuit may be devised in which the entire system extending from detection circuits through a matrix circuit to processing amplifiers is constituted by DC couplings. However, since the matrix circuit is interposed between the detection circuits to the processing amplifiers, the above described circuit system becomes too long, and the stability of the signal becomes poor.

SUMMARY OF THE INVENTION

Accordingly, a general object of the present invention is to provide a novel and useful signal processing circuit for a colour television camera in which the above described difficulties have been overcome.

Another and specific object of the invention is to provide a signal processing circuit for a color television camera which envelope detects modulated color signals obtained from a camera tube and then immediately provides signal processing amplification, and thereafter matrixing. In the circuit of the invention, a clamping pulse signal is not necessary for again restoring the DC component in each processing amplification circuit, as is done in the known circuit. Thus, the circuit is simple, and a composite color video signal of high stability can be obtained.

Still another object of the invention is to provide a signal processing circuit for a colour television camera having simple envelope detection circuits which are capable of continually operating with high stability, regardless of temperature fluctuations.

Other objects and further features of the invention will be apparent from the following detailed description when read in conjunction with the accompanying drawings.

BRIEF DESCRIPTION OF THE DRAWINGS

In the drawings:

FIG. 1 is a block diagram showing one example of a signal processing circuit for a color television camera, known heretofore;

FIG. 2 is a block diagram showing one embodiment of the signal processing circuit for a colour television camera, according to the present invention;

FIG. 3 is a combined optical and block diagram illustrating another embodiment of the signal processing circuit for a colour television camera according to the present invention;

FIG. 4 is an enlarged fragmentary frontal view of a filter for the front of a camera tube;

FIGS. 6(A), 6(B), and 6(C) are diagrams respectively indicating waveforms of high-frequency band components produced as output signals of a high-pass filter when the incident light on the color television image-pickup apparatus is red, blue, and white, respectively;

DETAILED DESCRIPTION

Figure 5:
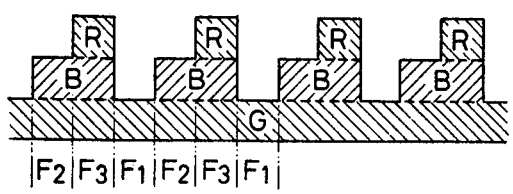
FIG. 5 is a diagram indicating the energy distribution of transmitted light when white light is projected onto the filter shown in FIG. 4.

For a full understanding of the nature and utility of the present invention, an example of a known signal processing circuit for a color television camera will first be described with reference to FIG. 1. A video signal from a camera, tube of a color television camera having a stripe filter mounted over the front surface thereof, is fed into an input terminal 10. This input video signal is a signal wherein the colour components of red (SR), green (SG), and blue (SB) have been encoded and amplitude modulated by the above mentioned stripe filter and then they are taken out and multiplexed. This input signal is supplied to band-pass filters 11 and 12 and a low-pass filter 13.

The output from the band-pass filters 11 and 12 are an amplitude-modulated SR signal and an amplitude-modulated SB signal of constant average level. These output signals are respectively supplied to envelope detection circuits 14 and 15 where envelope detection and restoration of the DC components occur, thereby being rendered signals having a constant black level. These signals are then supplied to a matrix circuit 16. The output signal from the low-pass filter 13 is led out and supplied to the matrix circuit 16.

The matrix circuit 16 carries out operations with respect to the signals supplied thereto and supplies a red color component video signal SR, a green color component video signal SG, and a blue color component video signal SB, as its outputs. These signals are supplied respectively to video processing amplifiers 17, 18, and 19. Clamping circuits in these processing amplifiers 17, 18, and 19 cause the black levels of the signals supplied thereto to become constant. Thereafter, circuits 17, 18, 19 carry out video signal processing amplification such as gamma (γ) correction, white clipping, linear clipping, and mixing of blanking signals. The outputs of these processing amplifiers 17, 18, and 19 are respectively supplied to a colour encoder 20, where a synchronizing signal from a synchronizing signal generator is added thereto. As a result of signal processing in this manner, a composite color video signal is obtained from an output terminal 21.

In this known circuit, the black levels of the signals supplied to the detection circuits 14 and 15 are made constant, and their DC components are restored. However, if the matrix circuit 16 is constituted by an AC coupling, when a matrixing operation of signals is carried out in the matrix circuit 16, the black level of the signal is no longer constant. Furthermore, even if the matrix circuit 16 is constituted by a DC coupling there are temperature fluctuations, since there is a long circuit extending from the detection circuit to the processing amplifiers. Therefore, the black level of a signal undergoing matrixing readily fluctuates in response to temperature fluctuations.

For this reason, in the above described circuit, the DC component restoration must be carried out again when the SR, SG, and SB output signals of the matrix circuit 16 are subjected to processing amplification in the processing amplifiers 17, 18, and 19. Consequently, clamping circuits are necessary in the processing amplifiers 17, 18, and 19. This necessity gives rise to problems such as a complication of the circuit and the inability of the circuit to obtain a composite colour video signal of high stability.

The present invention overcomes the difficulties encountered in the above described known circuit, and will now be described with respect to one embodiment thereof, with reference to FIG. 2. In FIG. 2, those parts which are the same as or equivalent to corresponding parts in FIG. 1 are designated by like reference numerals and characters. A detailed description of such parts will be omitted.

Output signals of the band-pass filters 11 and 12 are respectively supplied to detection and processing amplification circuits 30 and 31 which constitute an essential part of a circuit of the present invention. In the circuits 30 and 31, the amplitude modulated signals are subjected to detection in order to reproduce the DC components thereof. Immediately thereafter, there is a video signal processing amplification such as gamma correction, white clipping, linear clipping, and mixing of blanking signals.

The output signals of these detection and processing amplification circuits 30 and 31 are supplied to a matrix circuit 16, where they are subjected to a specific constant. As a result, the matrix circuit 16 produces an output red component video signal SR, a green component video signal SG, and a blue component video signal SB, which are supplied to a color encoder 20, where a synchronizing signal is added thereto. The resulting output signal is led out as a composite color video signal through an output terminal 21.

According to the present invention, the signals are envelope detected in the detection and processing amplification circuits 30 and 31, where their DC components are reproduced. Then, they are immediately subjected to processing amplification before they are supplied to the matrix circuit 16, as heretofore. The signals thus subjected to processing amplification have a DC component restoration and do not have black level fluctuations. For this reason, there is no necessity for again restoring the DC components upon processing amplification, as heretofore. According to the present invention, therefore, the circuit becomes simpler than known circuits, and a composite color video signal of high stability is obtained.

Next, another embodiment of a signal processing circuit of the present invention will be described in conjunction with FIG. 3.

The image light from an object 41, to be televised, passes through the camera lens 42 of a single tube type colour television camera and forms an image on the color-resolving striped filter 40. The optical image thus formed on this filter 40 is transmitted by way of a relay lens 43 and forms an image on the photoconductive surface (or photoelectric surface) of a camera tube 44.

The color-resolving striped filter 40 is described in detail, for example, in United States Pat. No. 3,846,579 and No. 4,041,528. As illustrated in FIG. 4, this colour-resolving striped filter 40 is made up of first, second, and third filter strips F1, F2, and F3 of equal widths a. Each stripe is oblong, and is narrow in the vertical direction. The stripes are laid consecutively and contiguously in the order named above, each set of stripes F1, F2 and F3 constituting one group. A plurality of such groups are laid consecutively and contiguously side-by-side in a single place. These filter stripes F1, F2 and F3, of all groups, extend in the direction (direction Y in FIG. 4) which is perpendicular to the horizontal scanning direction (direction X in FIG. 4). The stripes are arrayed in an orderly manner in the above mentioned sequence, and all filter stripes have the same spatial frequency.

The light transmitting characteristics respectively of these filter stripes F1, F2 and F3 are as follows. The first filter stripe F1 is adapted to transmit light of one primary color from among the three primary colors (red, green, and blue) of additional mixed colors. The second filter stripe F2 is adapted to transmit light of mixed colors of the primary color transmitted through the first filter stripe and one of the two remaining primary colors (i.e. not the primary color transmitted through the first filter stripe). The third filter stripe F3 is adapted to transmit the light of all colour (e.g. white light).

More specifically, the second filter stripe F2 is capable of transmitting light of colors respectively having the following relationships, depending on whether the primary color transmitted through the first filter stripe F1 is red, green or blue.

| Primary colour light transmitted through first filter stripe F1 | Colour of light transmitted through second filter stripe F2 |
|---|---|
| red light | magenta (red blue) or yellow (red green) |
| green light | yellow (red green) or cyan (blue green) |
| blue light | magenta (red blue) or cyan (blue green) |

The energy state of the light transmitted when a white light (W) is projected onto the colour-resolving striped filter 40 is as illustrated by one example in FIG. 5, in which the horizontal direction (X-axis direction) represents energy distribution. That is, green light (G) is continuously distributed since it is transmitted through all filter stripes F1, F2 and F3. Blue light (B) is distributed over a width 2a separated by space intervals a, since it only passes through the filter stripes F2 and F3. Red light (R) is distributed over a width a separated by space intervals of 2a since it is only transmitted through the filter stripe F3.

When a white light image is introduced, as an incident light passing through the camera lens 42, the resulting output signal S is obtained from the camera tube 44. This signal can be represented as a periodic function having a fundamental repetitive period described by the pitch of the respective stripes of the color-resolving striped filter. This is represented as $$S = Sd + Sh \ldots \quad (1)$$

where the signal Sd is a direct wave (DC component) signal comprising a mixture of a luminance signal Y, a green light signal SG, a blue light signal SB, and a red light signal SR. The resulting signal can be represented by $$Sd = SG + 2SB/3 + SR/3 \quad \ldots (2)$$

The signal Sh is a high-band component (AC component) signal comprising a group of modulated color signals, having forms resulting from an amplitude modulation of a specific carrier wave and of other carrier waves with a mixture signal. The specific carrier wave has a frequency which is the same as the space frequency determined by the number of groups of filter stripes F1, F2 and F3 of the color-resolving striped filter 10. The other carrier waves have frequencies which are the same as higher harmonics of the specific carrier wave. The mixture signal is made up of two primary colors other than the primary (which is green color light in the instant example) passing through the first filter stripe F1.

The above mentioned output signal S of the camera tube 44 (FIG. 3) is amplified by a preamplifier 45. Then, it is supplied to low-pass filters 46 and 47 and a high-pass filter 48. A luminance signal Y is derived from the low-pass filter 46. The above mentioned direct signal Sd is derived from the low-pass filter 47. Furthermore, the high frequency band component signal Sh is derived from the high-pass filter 48.

When only red light reaches the camera lens 42, the high-band component signal Sh is only the red signal SR indicated in FIG. 6(A). When only a blue light is present, the high-band component signal Sh becomes only the blue signal SB indicated in FIG. 6(B). Furthermore, when a white light is present in the camera, the high-band component signal Sh becomes a signal of a waveform as indicated in FIG. 6(C).

Here, the interval on the time axis within which the red signal SR and the blue signal SB can be generated is determined by the positions of the filter stripes F1, F2, and F3. For this reason, there is a constant phase relationship between the blue signal SB and the red signal SR when these two signals are simultaneously present, at any point on the time axis.

Accordingly, if the red signal SR of the waveform indicated in FIG. 6(A) and the blue signal SB of the waveform indicated in FIG. 6(B) are mixed, the resulting signal is a high-band component signal Sh of the waveform indicated in FIG. 6(C). In FIGS. 6(A), 6(B), and 6(C), the lines O—O represent the average zero level (alternating current axis) of the respective signals. The peak value of the positive wave of the red signal SR (FIG. 6(A)) is $\frac{2}{3}$ SR. The peak value of the negative wave thereof is $-\frac{1}{3}$ SR. The peak value of the positive wave of the blue light SB (FIG. 6(B)) is $\frac{1}{3}$ SB, while the peak value of the negative wave thereof is $-\frac{2}{3}$ SB. Furthermore, the peak value of the positive wave of the high-band component signal Sh (FIG. 6(C)) is ($\frac{2}{3}$ SR + $\frac{1}{3}$ SB), while the peak value of the negative wave is $-(\frac{1}{3}$ SR + $\frac{2}{3}$ SB).

The high-band component signal Sh is indicated in FIG. 6(C) which has been derived from the high-pass filter 48. Signal Sh is supplied respectively to envelope detection and processing amplification circuits 49 and 50 (FIG. 3).

The upper envelope of the signal Sh, supplied to the envelope detection and processing amplification circuit 49, is first detected and becomes a signal of constant black level expressed as $\frac{1}{3}$ (2SR + SB). The output signal which is envelope detected is immediately subjected to processing amplification such as gamma ($\gamma$) correction. At the same time, the lower envelope of the signal Sh supplied to the envelope detection and processing amplification circuit 33 is first detected and becomes a signal of constant black level expressed as $\frac{1}{3}$ (2SB + SR). The output signal which is envelope detected is similarly subject to processing amplification such as gamma correction.

On the other hand, the low-frequency component is filtered in the low-pass filter 47, from which a signal expressed by $\frac{1}{3}$ (3SG + 2SB + SR) is obtained. This output signal is gamma corrected in a processing amplifier 51. In this connection, processing such as white clipping, linear clipping, and mixing of blanking signals may be carried out in addition to gamma correcting in these envelope detection and processing amplification circuits 49 and 50, and the process amplifier 51.

The output signals of these envelope detection and processing amplification circuits 49 and 50 and the processing amplifier 51 are supplied to a matrix circuit 16, where they are given with a specific constant. As a result, the matrix circuit 16 produces an output signal, which is a red component video signal SR, a green component video signal SG, and a blue component video signal SB, which are supplied to a color encoder 20, where a synchronizing signal is added thereto. The resulting output signal is a composite color video signal appearing at an output terminal 21.

According to the circuit of the present invention, the signals which have been envelope detected in the envelope detection and processing amplification circuits 49 and 50, have their DC components restored, and then are directly subjected to processing amplification before they are supplied to the matrix circuit 16, as heretofore. The signals from the processing amplification circuit have a DC component restoration and do not have black level fluctuation components. For this reason, there is no necessity for again carrying out a restoration of the DC components, upon processing amplification. According to the present invention, therefore, the circuit becomes simpler than known circuits, and a composite color video signal of high stability is obtained.

Figure 7:
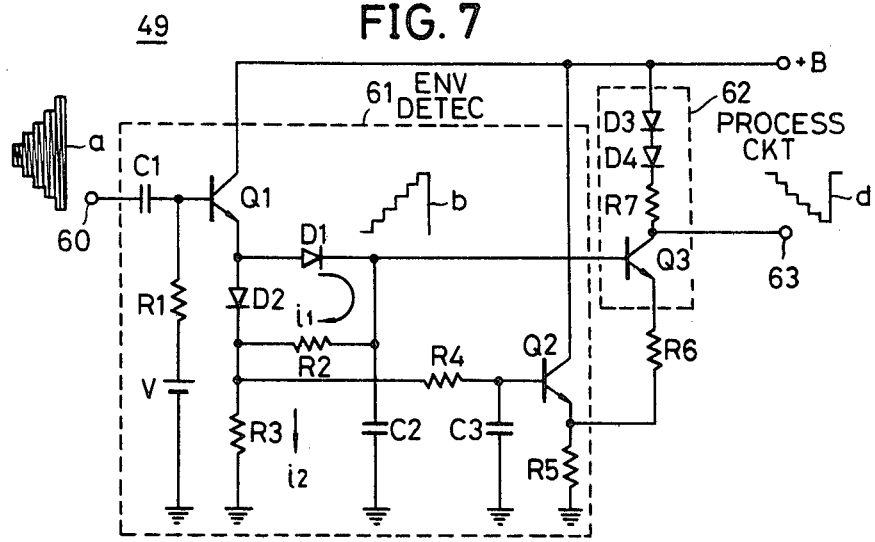
FIG. 7 is a circuit diagram of one embodiment of an essential part of the circuit shown by the block diagram in FIG. 3.

One specific embodiment of a circuit for the above mentioned envelope detection and processing amplification circuit 49 will now be described in conjunction with FIG. 7. The amplitude-modulated signal a from the high-pass filter 48 is introduced into an envelope detection circuit 61, through an input terminal 60, and is applied through a capacitor C1 to the base of a transistor Q1. Between the base of this transistor Q1 and ground, a resistor R1 and a bias power source V are connected in series. The emitter of the transistor Q1 is connected, by way of a diode D1, for envelope detection to the base of a transistor Q2. Between the emitter of the transistor Q1 and ground, a diode D2 for temperature compensation and a resistor R3 are connected in series. A resistor R2 is connected between the cathode of the diode D1 and the junction point between the diode D2 and the resistor R3. A capacitor C2 is connected between the cathode of the diode D1 and ground. The junction point between the diode D2 and the resistor R3 is connected through a resistor R4 to the base of the transistor Q2. A capacitor C3 and a resistor R5 are connected respectively between the base of the transistor Q2 and ground and between the emitter of the transistor Q2 and ground.

Diodes D3 and D4 and a resistor R7 are connected in series between the collector of a transistor Q3 and the +B terminal of the power source and, together with the transistor Q3, constitute a gamma correction circuit 62, as the processing amplification circuit. The emitter of the transistor Q3 is connected through a resistor R6 to the emitter of the transistor Q2. The transistor Q2, together with the transistor Q3, constitutes a differential amplifier.

The input signal introduced through the input terminal 60 receives a bias imparted by the power source V. Passing through the transistor Q1, its upper envelope is detected by the diode D1, thereby making a signal b of constant black level, which is applied to the base of the transistor Q3. The black level signal b supplied to the transistor Q3 is gamma corrected, by a known operation, by means of a nonlinear resistance circuit for gamma correction comprising the diodes D3 and D4. A resulting signal d is led out through an output terminal 63 and supplied to the matrix circuit 16.

In this case, the bias current i1 flowing through the diode D1 is very small. The current flowing through the diode D2 is the difference resulting from the subtraction of this current i1 from the current i2 flowing through the resistor R3. This current i2 flowing through the resistor R3 is actually in the order of 5mA and is very large in comparison with the current i1. Therefore, the current i2 can be considered to be substantially the entire current flowing through the diode D2, and this diode D2 can be regarded to be a source of substantially a constant voltage.

Figure 8:
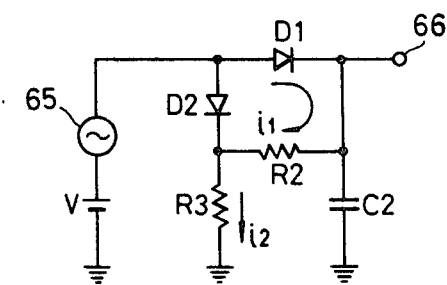
FIG. 8 is an equivalent circuit diagram of an essential part of the circuit shown in FIG. 7.

In this case, when the bias voltage V fluctuates in response to a temperature fluctuation, the current i2 fluctuates. In the equivalent circuit of FIG. 8, the following expressions are obtained for the current i1 and the voltage VD2 across the terminals of the diode D2.

$$i1 = 1/R2\ (VD2 - VD1)$$

$$VD2 = V - R3\ i2$$

where VD1 is the terminal voltage of the diode D1. In FIG. 8, reference numerals 65 and 66 respectively designate an AC input power source and an output terminal. Then, the fluctuation $\Delta V2$ of the voltage VD2, at the time when the current i2 fluctuates, is determined as follows.

$$VD2 = \frac{kT}{q} \ln\left(\frac{i2}{Is} + 1\right)$$

where Is is the saturation current of the diode. Accordingly, $$\begin{aligned}\Delta VD2 &= \frac{\partial VD2}{\partial i2} \cdot \Delta i2 \\ &= \frac{kT}{q} \cdot \frac{1}{i2 + Is} \cdot \Delta i2 \\ &\approx \frac{25\ mV}{i2 + Is} \cdot \Delta i2\end{aligned}$$

where $\Delta i2$ is the fluctuation of the current i2.

Then, when $i2 \gg Is$ and $i2 = 5mA$, $$\Delta VD2 = \frac{5mV}{1mA} \cdot \Delta i2$$

For example, when $\Delta i2$ is taken to be 1mA, the fluctuation $\Delta VD2$ of the terminal voltage VD2 of the diode D2 is in the order of merely 5mV.

Therefore, even when the bias voltage V fluctuates as a result of a temperature fluctuation, the fluctuation of the voltage across the terminals of the series-connection circuit of the diode D1 and the resistor R2 is very small, whereby the operation is stable despite the fluctuation of the bias voltage V.

Furthermore, when the fluctuation $\Delta i1$ of the bias current i1 is considered, the resistance value of the resistor R2 is constant, the following relationship is obtained.

$$\Delta i1 = \frac{1}{R2} (\Delta VD2 - \Delta VD1)$$

As is apparent from this equation, the fluctuation $\Delta i1$ can readily be made zero by using diodes of the same characteristics for the diodes D1 and D2.

In this connection, these diodes D1 and D2 may be constituted by transistors, and the diode D2 may be constituted by a heat-sensitive resistance element such as a thermistor.

Furthermore, these rectifying elements may be in the form of a connection of a plurality thereof.

Further, this invention is not limited to these embodiments. Variations and modifications may be made without departing from the scope of the invention.

What is claimed is:

1. A signal processing circuit for a color television camera having a camera tube which generates a multiplex output signal comprising a direct wave signal and a plurality of amplitude-modulated signals, said circuit comprising:

filter means responsive to an output signal of the camera tube for individually separating a direct wave signal from a plurality of amplitude-modulated signals;

a plurality of detection and processing means corresponding to each of the separated amplitude-modulated signals, each of the plurality of detection and processing means comprising detection means for detecting its corresponding separated amplitude-modulated signal to produce a detected signal having restored DC components, and gamma correction means for gamma-correcting the detected signal;

processing circuit means comprising gamma correction means for gamma-correcting the separated direct wave signal;

matrix means for matrixing the output signals of said plurality of detection and processing means and said processing circuit to obtain three primary color signals; and color encoding means for producing a composite color video signal from the output three primary color signals of said matrix means.

2. A signal processing circuit as claimed in claim 1, wherein said detection means comprises an envelope detection circuit means for envelope-detecting its corresponding separated amplitude-modulated signal.

3. A signal processing circuit as claimed in claim 1, wherein each of said processing circuit means and the plurality of detection and processing means further comprises white-clipping circuit means for clipping the output signal of its corresponding gamma correction means at a predetermined white level.

4. A signal processing circuit as claimed in claim 1, wherein each of said processing circuit means and the plurality of detection and processing means further comprises mixing means for mixing a blanking signal with the output signal of its corresponding gamma correction means.

5. A signal processing circuit as claimed in claim 4, wherein each of said processing circuit means and the plurality of detection and processing means further comprises linear clipping circuit means for clipping the blanking signal of the output signal of its corresponding mixing means at a specific level.

6. A signal processing circuit as claimed in claim 1, wherein said detection means comprises an envelope detection circuit comprising: a first transistor having a base electrode coupled to a bias power source; a first diode for envelope detection connected to an output electrode of the transistor; a first resistor; a second diode for temperature compensation connected in cascade with the first resistor between the output electrode of the transistor and ground; and a second resistor connected between the output electrode of the first diode and the junction point between the second diode and the first resistor; an enveloped detected signal being derived from the output electrode of the first diode.

7. A signal processing circuit as claimed in claim 6, wherein said gamma correction means comprises a second transistor having a base electrode connected to said first diode, and a series combination of a third resistor and a plurality of diodes, said combination being connected to an output electrode of said second transistor to gamma-correct the output signal of said envelope detection circuit.

8. A signal processing circuit for a color television camera having a camera tube with a color resolving striped filter which generates output signals comprising a direct wave signal and a multiplex high-band component signal comprising a plurality of amplitude-modulated signals, said circuit comprising:

high-pass filter means for separating the high-band component signal from an output signal of said camera tube;

first detection and processing means comprising first detection means for detecting an upper envelope of an output signal of said high-pass filter means to produce an output signal having restored DC components which are expressed by $k(2SR+SB)$ wherein k is a constant, SR and SB being a red light signal component and a blue light signal component in the output signal of said camera tube, and first gamma correction means for gamma-correcting the output signal of said first detection means;

second detection and processing means comprising second detection means for detecting a lower envelope of the output signal of said high-pass filter means to produce an output signal having restored DC components which are expressed by $k(2SB+SR)$, and second gamma correction means for gamma-correcting the output signal of said second detection means;

low-pass filter means for separating from the output signal of said camera tube the direct wave signal which is expressed by $k(3SG+2SB+SR)$ wherein SG is a green light signal component in the output signal of said camera tube;

processing circuit means comprising third gamma correction means for gamma-correcting the separated direct wave signal;

matrix means for matrixing the output signals of the first and second detection and processing means and said processing circuit means to separately reproduce the red light signal component, the green light signal component and the blue light signal component; and color encoding means responsive to the reproduced red, green and blue light signal components for producing a composite color video signal.

9. A signal processing circuit as claimed in claim 8 wherein each of said processing circuit means and the first and second detection and processing means further comprises white clipping circuit means for clipping the output signal of its corresponding gamma correction means at a predetermined white level.

10. A signal processing circuit as claimed in claim 8, wherein each of said processing circuit means and the first and second detection and processing means further comprises mixing means for mixing a blanking signal with the output signal of its corresponding gamma correction means.

11. A signal processing circuit as claimed in claim 10, wherein each of said processing circuit means and the first and second detection and processing means further comprises linear clipping circuit means for clipping the blanking signal of the output signal of its corresponding mixing means at a specific level.

12. A signal processing circuit for a color television camera having a camera tube, said circuit comprising:

high-pass filter means for receiving input signals comprising a multiplexed plurality of amplitude-modulated color component signals obtained from a camera tube, said filtering means filtering the high-frequency components of the input signal;

detection and processing means responsive to output signals of the high-pass filter means for producing signals having restored DC components, said processing means correcting said filter passed signals for gamma correction, white clipping, linear clipping, and blanking signal mixing;

low-pass filter means responsive to input signals from the camera tube for filtering the low-frequency components of the input signal;

processing circuit means responsive to the output of said low-pass filter means for processing output signals of the low-pass filter;

matrix means for matrixing output signals of the detection and processing means with output signals of the processing circuit means in order to obtain three primary color signals; and color encoder means responsive to the three primary color output signals of the matrix circuit for providing a composite color video signal.

13. A signal processing circuit as claimed in claim 12 in which there are a plurality of said detection and processing means, each of said detection and processing means comprising envelope detection means for envelope detecting output signals from each of the filter means, and processing circuit means responsive to the output signal of the envelope detection circuit for processing directly said signals.

14. A signal processing circuit for a color television camera having a camera tube with a color resolving stripe filter, said circuit comprising:

high-pass filter means responsive to input signals comprising multiplexed amplitude-modulated color component signals for red (R), green (G), and blue (B) from the camera tube, said high-pass filter means filtering the high-frequency components of the input signals;

first envelope detection and processing means responsive to the output signal of the high-pass filter for detecting the upper envelope of said output signal and producing a signal SIG 1 which is expressed by k(2SR+SB), where: SR is a red signal, SB is a blue signal, and k is a constant; means for restoring the DC component of said signal SIG 1, and for carrying out gamma-correcting, white clipping, linear clipping, and blanking signal mixing of said signal SIG 1;

second envelope detection and processing means responsive to the output signal of the high-pass filter means for detecting the lower envelope of said output signal and producing a signal SIG 2 which is expressed by k(2SB+SR), means for restoring the DC component of said signal SIG 2;

low-pass filter means responsive to signals from the camera tube for filtering the low-frequency component of the camera tube signals to produce an output signal SIG 3 expressed by k(3SG+2SB+SR), where SG is a green signal;

processing circuit means responsive to the output signal of the low-pass filter means for processing signals;

matrix means responsive to the output signals of the first and second envelope detection and processing means and of the processing circuit means for producing R, G, and B output signals; and color encoder means for adding a synchronizing signal to the output signals of the matrix circuit to produce a composite color video signal.

15. A signal processing circuit as claimed in claim 14 in which each envelope detection and processing means comprises an envelope detection means comprising: a first transistor having a base coupled to a bias power source; first envelope detection diode means coupled to an output electrode of the transistor; a first resistor; second temperature compensating diode means connected in a cascade connection with the first resistor coupled between an output electrode of the transistor and ground; and a second resistor coupled between an output side of the first diode and a junction point between the second diode and the first resistor, an envelope detected signal appearing at an output side of the first diode.

16. A signal processing circuit as claimed in claim 15 in which each envelope detection and processing means further comprises a processing circuit means including a second transistor having a base electrode connected to the first diode, and means connected to an output electrode of the second transistor processing signals.

* * * * *